United States Patent
Enge et al.

(10) Patent No.: US 8,760,712 B2
(45) Date of Patent: Jun. 24, 2014

(54) MODIFYING PRINT DATA USING MATCHING PIXEL PATTERNS

(75) Inventors: James Michael Enge, Spencerport, NY (US); Joseph Edward Lill, Waynesville, OH (US); Michael Patrick Fink, Springboro, OH (US); Brad Smith, Xenia, OH (US); Carolyn Carlisle, legal representative, Centerville, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/599,129

(22) Filed: Aug. 30, 2012

(65) Prior Publication Data

US 2014/0063513 A1 Mar. 6, 2014

(51) Int. Cl.
*G06K 15/02* (2006.01)
*H04N 1/60* (2006.01)

(52) U.S. Cl.
CPC ............ *G06K 15/027* (2013.01); *H04N 1/6033* (2013.01)
USPC .......................................... 358/1.8; 358/3.24

(58) Field of Classification Search
USPC ................................ 358/1.8, 3.24, 3.32, 1.12
See application file for complete search history.

(56) References Cited

U.S. PATENT DOCUMENTS

| 4,721,969 | A | 1/1988 | Asano |
| 5,093,674 | A | 3/1992 | Storlie |
| 5,505,129 | A | 4/1996 | Greb et al. |
| 5,806,430 | A | 9/1998 | Rodi |
| 6,253,678 | B1 | 7/2001 | Wentworth |
| 6,362,847 | B1 | 3/2002 | Pawley et al. |
| 6,895,862 | B1 | 5/2005 | Ben-Chorin et al. |
| 6,927,875 | B2 | 8/2005 | Ueno et al. |
| 6,960,036 | B1 * | 11/2005 | Fujita et al. .............. 400/124.11 |
| 7,116,838 | B2 * | 10/2006 | Gindele et al. ................ 382/260 |
| 7,871,145 | B1 | 1/2011 | Enge |
| 8,004,714 | B2 * | 8/2011 | Metcalfe et al. ............. 358/1.18 |
| 2007/0172270 | A1 | 7/2007 | Jorgens et al. |
| 2008/0260263 | A1 * | 10/2008 | Metcalfe et al. ............. 382/218 |
| 2011/0102851 | A1 | 5/2011 | Baeumler |
| 2013/0044948 | A1 * | 2/2013 | Gaubatz et al. ............... 382/166 |

* cited by examiner

*Primary Examiner* — Jerome Grant, II
(74) *Attorney, Agent, or Firm* — Kevin E. Spaulding

(57) ABSTRACT

A method for aligning multi-channel digital image data for a digital printer having a plurality at least one printhead is described. One or more spatial adjustment parameters are determined for each of the printheads. The spatial adjustment parameters can be determined by comparing locations of test pattern indicia in a printed test pattern to predefined reference indicia locations. Digital image data for the non-reference printheads is modified by designating an input pixel neighborhood within which an image pixel should be inserted or deleted, comparing the image pixels in the input pixel neighborhood to a plurality of predefined pixel patterns to identify a matching pixel pattern; and determining a modified pixel neighborhood responsive to the matching pixel pattern.

14 Claims, 11 Drawing Sheets

| PATTERN # | INPUT PIXEL PATTERN | | | | PIXEL INSERTION RULE | PIXEL DELETION RULE |
|---|---|---|---|---|---|---|
| | PIXEL #1 | PIXEL #2 | PIXEL #3 | PIXEL #4 | | |
| 1 | 0 | 0 | 0 | 0 | PIXEL VALUE = 0 | PIXEL VALUE = 0 |
| 2 | 0 | 0 | 0 | 1 | PIXEL VALUE = 0 | USE ERROR DIFFUSION |
| 3 | 0 | 0 | 1 | 0 | USE ERROR DIFFUSION | USE ERROR DIFFUSION |
| 4 | 0 | 0 | 1 | 1 | USE ERROR DIFFUSION | USE ERROR DIFFUSION |
| 5 | 0 | 1 | 0 | 0 | USE ERROR DIFFUSION | PIXEL VALUE = 1 |
| 6 | 0 | 1 | 0 | 1 | USE ERROR DIFFUSION | USE ERROR DIFFUSION |
| 7 | 0 | 1 | 1 | 0 | PIXEL VALUE = 1 | PIXEL VALUE = 1 |
| 8 | 0 | 1 | 1 | 1 | PIXEL VALUE = 1 | USE ERROR DIFFUSION |
| 9 | 1 | 0 | 0 | 0 | PIXEL VALUE = 0 | PIXEL VALUE = 0 |
| 10 | 1 | 0 | 0 | 1 | PIXEL VALUE = 0 | USE ERROR DIFFUSION |
| 11 | 1 | 0 | 1 | 0 | USE ERROR DIFFUSION | USE ERROR DIFFUSION |
| 12 | 1 | 0 | 1 | 1 | USE ERROR DIFFUSION | PIXEL VALUE = 0 |
| 13 | 1 | 1 | 0 | 0 | USE ERROR DIFFUSION | USE ERROR DIFFUSION |
| 14 | 1 | 1 | 0 | 1 | USE ERROR DIFFUSION | USE ERROR DIFFUSION |
| 15 | 1 | 1 | 1 | 0 | PIXEL VALUE = 1 | USE ERROR DIFFUSION |
| 16 | 1 | 1 | 1 | 1 | PIXEL VALUE = 1 | PIXEL VALUE = 1 |

| PATTERN # | MODIFIED PIXEL PATTERN | | | | |
|---|---|---|---|---|---|
| | PIXEL #1 | PIXEL #2 | NEW | PIXEL #3 | PIXEL #4 |
| 1 | 0 | 0 | 0 | 0 | 0 |
| 2 | 0 | 0 | 0 | 0 | 1 |
| 3 | 0 | 0 | ED | 1 | 0 |
| 4 | 0 | 1 | ED | 1 | 1 |
| 5 | 0 | 1 | ED | 0 | 0 |
| 6 | 0 | 1 | ED | 0 | 1 |
| 7 | 0 | 1 | 1 | 1 | 0 |
| 8 | 0 | 0 | 1 | 1 | 1 |
| 9 | 1 | 0 | 0 | 0 | 0 |
| 10 | 1 | 0 | 0 | 0 | 1 |
| 11 | 1 | 1 | ED | 1 | 0 |
| 12 | 1 | 0 | ED | 1 | 1 |
| 13 | 1 | 1 | ED | 0 | 0 |
| 14 | 1 | 1 | ED | 0 | 1 |
| 15 | 1 | 1 | 1 | 1 | 0 |
| 16 | 1 | 1 | 1 | 1 | 1 |

430

| PATTERN # | MODIFIED PIXEL PATTERN 430 | | |
|---|---|---|---|
| | PIXEL #1 | NEW | PIXEL #4 |
| 1 | 0 | 0 | 0 |
| 2 | 0 | ED | 1 |
| 3 | 0 | ED | 0 |
| 4 | 0 | ED | 1 |
| 5 | 0 | 1 | 0 |
| 6 | 0 | ED | 1 |
| 7 | 0 | 1 | 0 |
| 8 | 0 | ED | 1 |
| 9 | 1 | ED | 0 |
| 10 | 1 | 0 | 1 |
| 11 | 1 | ED | 0 |
| 12 | 1 | 0 | 1 |
| 13 | 1 | ED | 0 |
| 14 | 1 | ED | 1 |
| 15 | 1 | ED | 0 |
| 16 | 1 | 1 | 1 |

*FIG. 10B*

MODIFYING PRINT DATA USING MATCHING PIXEL PATTERNS

CROSS-REFERENCE TO RELATED APPLICATIONS

Reference is made to commonly assigned, co-pending U.S. patent application Ser. No. 13/599,067, entitled: "Aligning image data for using matching pixel patterns", by Enge et al.; and to commonly assigned, co-pending U.S. patent application Ser. No. 13/599,096, entitled: "Aligning image data for overlapping printheads", by Enge et al., each of which is incorporated herein by reference.

FIELD OF THE INVENTION

This invention generally relates to digital printing systems, and more particularly to a method for aligning image data to a predefined reference position.

BACKGROUND OF THE INVENTION

In multi-channel digital printing systems, images for a plurality of image channels are printed in alignment onto a receiver medium. In many such digital printing systems, a plurality of printing modules (e.g., inkjet printheads or electrophotographic print engines) are provided, one for each channel, and multi-channel images are printed by moving a receiver medium past each of the printing modules where the channels are printed in sequence. Typically, the different channels (i.e., "image planes") are used to print different colorants (e.g., cyan, magenta, yellow and black). In some embodiments, a plurality of channels may be used to print a single colorant, or light and dark variations of the same colorant. For example a black colorant can be printed using two different printer channels to increase the density of the printed image. In some embodiments, a first set of channels can be used to print on one side of the receiver medium, and a second set of channels can be used to the print on the opposite side of the receiver medium (using the same or different colorants).

The printed item produced by the digital printing systems need not be restricted to an image printed on the receiver medium for viewing by an observer, but can also include items printed for a functional purpose such as printed circuitry. In this example, the different channels can correspond to different layers in a multi-layer circuit.

In some applications, the receiver medium may undergo changes between the printing of one channel and another. For example, when a multi-color image is printed by depositing ink on a paper-based receiver media, the water in the ink printed for one channel can cause the receiver medium to expand before a subsequent channel is printed. The receiver media could also undergo other processing steps between the printing of the image planes that could change the dimensions of the receiver media. For example, the receiver media could pass through a dryer (in case of printing with liquid inks) or a fusing step (in case of dry powder electrophotography) between the printing of the various channels, which could cause the receiver media to shrink before the printing of a subsequent channel. The desired registration of one channel to another can be adversely affected by the dimensional changes of the receiver media between the printing of the multiple channels. In many cases, the dimensional changes in the receiver may be a function of a variety of factors such as image content of the printed image and environmental conditions.

In another example, a non-conductive layer could be applied over conductive traces for a layer of circuitry printed on a receiver medium before the printing of a subsequent image plane for another layer of circuitry, where the application of the non-conductive layer produces dimensional changes in the receiver media (and the already printed image plane). In such systems, the desired registration of one image plane to another can be adversely affected by the dimensional changes of the receiver media between the printing of the multiple layers.

In some cases, the printing modules used for printing the different channels may have some variation between them, so that there is a dimensional scaling or magnification change between the channels printed by the different printing modules.

In other applications, it may be necessary to adjust the dimensions of a document printed by a digital printing system even if it contains only a single channel. Such an adjustment may be necessary to match the dimensions of the printed document with the dimensions required by a downstream process. For example it may be necessary to adjust the print width of the printed document so that it correlates with the width of a downstream slitting, perforating, or folding operation.

U.S. Pat. No. 4,721,969 to Asano, entitled "Process of correcting for color misregistering in electrostatic color recording apparatus," teaches a method for correcting color misregistration errors by inserting or deleting an appropriate number of pixels across the width of the image in a uniformly-spaced pattern.

U.S. Pat. No. 5,093,674 to Storlie, entitled "Method and system for compensating for paper shrinkage and misalignment in electrophotographic color printing," discloses a method for adjusting an image size for a channel of an electrophotographic printer by altering a scanning mirror speed.

U.S. Pat. No. 5,505,129 to Greb et al., entitled "Web width tracking," discloses a method for tracking the width of a printed medium by detecting the edges of the medium.

U.S. Pat. No. 6,362,847 to Pawley et al., entitled "Electronic control arrangement for a laser printer," discloses a method for adjusting a length of a printed line by inserting or removing clock timing pulses.

U.S. Pat. No. 6,927,875 to Ueno et al., entitled "Printing system and printing method," teaches a method for correcting for heat shrinkage by controlling a timing of light emission. The shrinkage is characterized by detecting media edges.

U.S. Patent Application Publication 2007/0172270 to Joergens et al., entitled "Method and device for correcting paper shrinkage during generation of a bitmap," discloses a method for compensating for paper shrinkage by adding or removing image pixels, preferably in un-inked locations.

U.S. Patent Application Publication 2011/0102851 to Baeumler, entitled "Method, device and computer program to correct a registration error in a printing process that is due to deformation of the recording medium," discloses a method for deforming an image to correct for registration errors, wherein the pixels to be deformed are selected stochastically.

There remains a need for digital printing systems to correct for any dimensional differences between different image channels that can result from various sources so that the various channels of the printed image can be properly registered.

SUMMARY OF THE INVENTION

The present invention represents a method for aligning digital image data for a digital printer including at least one printhead, comprising:

receiving one or more spatial adjustment parameters;

receiving digital image data including image pixels having pixel values;

modifying the digital image data to be printed with at least one printhead in accordance with the spatial adjustment parameters, wherein the modification of the digital image data includes:

designating an input pixel neighborhood within which an image pixel should be inserted or deleted based on the corresponding determined spatial adjustment parameters;

comparing the image pixels in the input pixel neighborhood to a plurality of predefined pixel patterns and identifying a matching pixel pattern; and determining a modified pixel neighborhood having either one more image pixel or one less image pixel than the input pixel neighborhood, wherein the pixel values of the image pixels in the modified pixel neighborhood are determined responsive to the matching pixel pattern; and printing the modified digital image data using the digital printer;

wherein the modification of the digital image data provides improved alignment of the printed image data with respect to a reference position.

This invention has the advantage that the alignment of image content printed with different channels is improved.

It has the additional advantage that the alignment of the printed image content relative to other system components, such as slitting, perforating, or folding systems, is improved.

It has the further advantage that image pixels are inserted or deleted based on predefined pixel patterns, thereby reducing image artifacts by ensuring that the image pixels are inserted or deleted based on the most appropriate rules.

BRIEF DESCRIPTION OF THE DRAWINGS

In the detailed description of the example embodiments of the invention presented below, reference is made to the accompanying drawings, in which:

FIG. 8 shows an example set of pixel insertion and deletion rules associated with different input pixel patterns;

FIGS. 10A and 10B illustrate exemplary modified pixel patterns formed using the method of FIG. 9.

Figure 1:
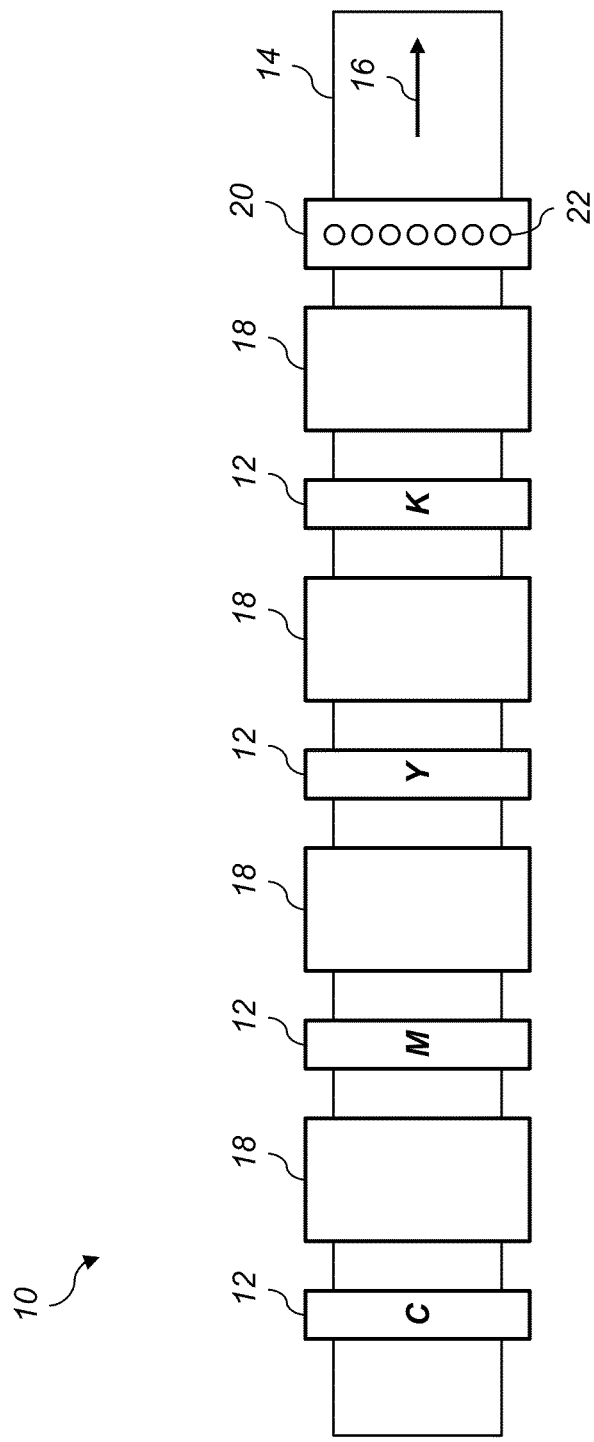
FIG. 1 is a diagram illustrating a multi-channel digital printing system useful in an exemplary embodiment of the present invention.

It is to be understood that the attached drawings are for purposes of illustrating the concepts of the invention and may not be to scale.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present invention is well-suited for use in roll-fed inkjet printing systems that apply colorant (e.g., ink) to a web of continuously moving print media. In such systems a printhead selectively moistens at least some portion of the media as it moves through the printing system, but without the need to make contact with the print media. While the present invention will be described within the context of a roll-fed inkjet printing system, it will be obvious to one skilled in the art that it could also be used for other types of printing systems as well including sheet-fed printing systems and electrophotographic printing systems.

In the context of the present invention, the terms "web media" or "continuous web of media" are interchangeable and relate to a receiver media (e.g., a print media) that is in the form of a continuous strip of media as it passes through the web media transport system from an entrance to an exit thereof. The continuous web media serves as the receiving medium to which one or more colorants (e.g., inks or toners), or other coating liquids are applied. This is distinguished from various types of "continuous webs" or "belts" that are actually transport system components (as compared to the print receiving media) which are typically used to transport a cut sheet medium in an electrophotographic or other printing system. The terms "upstream" and "downstream" are terms of art referring to relative positions along the transport path of a moving web; points on the web move from upstream to downstream.

Additionally, as described herein, the example embodiments of the present invention provide a printing system or printing system components typically used in inkjet printing systems. However, many other applications are emerging which use inkjet printheads to emit liquids (other than inks) that need to be finely metered and deposited with high spatial precision. As such, as described herein, the terms "liquid," "ink," "print," and "printing" refer to any material that can be ejected by the liquid ejector, the liquid ejection system, or the liquid ejection system components described below.

FIG. 1 shows a diagram illustrating a multi-channel digital printing system 10 for printing on a web of receiver medium 14. The printing system 10 includes a plurality of printing modules 12, each adapted to print image data for an image plane corresponding to a different color channel. In a preferred embodiment, the printing modules 12 are inkjet printing modules adapted to print drops of ink onto the receiver medium 14 through an array of inkjet nozzles. In other embodiments, the printing modules 12 can be electrophotographic printing modules that produce images by applying solid or liquid toner to the receiver medium 14. Alternately, the printing modules 12 can utilize any type of digital printing technology known in the art.

In the illustrated embodiment, the printing modules 12 print cyan (C), magenta (M), yellow (Y) and black (K) colorants (e.g., inks) onto the receiver medium 14 as it passes through the printing system from an upstream to a downstream in the receiver motion direction 16. In other embodiments, the printing modules 12 can be adapted to print different numbers and types of colorants. For example, additional printing modules 12 can be used to print specialty colors, or extended gamut colorants. In some embodiments, a plurality of the printing modules 12 can be used to print the same colorant (e.g., black), or density variations of the same color (e.g., gray and black). In some embodiments, the printing system 10 is adapted to print double-sided pages. In this case, one or more of the printing modules 12 can be arranged to print on a back side of the receiver medium 14.

The exemplary printing system 10 also includes dryers 18 for drying the ink applied to the receiver medium 14 by the printing modules. While the exemplary embodiment illustrates a dryer 18 following each of the printing modules 12, this is not a requirement. In some embodiments, a single dryer 18 may be used following the last printing module 12, or dryers 18 may only be provided following some subset of the printing modules 12. Depending on the printing technology used in the printing modules 12, and the printing speed, it may not be necessary to use any dryers 18

Downstream of the printing modules 12, an imaging system 20, which can include one or more imaging devices 22 for capturing images of printed images on the receiver medium 14. In some embodiments, the imaging system 20 can include a single imaging device 22 that captures an image of the entire width of the receiver medium 14, or of a relevant portion thereof. In other embodiments, a plurality of imaging devices 22 can be used, each of which captures an image of a corresponding portion of the printed image. In some embodiments, the position of the imaging devices 22 can be adjusted during a calibration process to sequentially capture images of different portions of the receiver medium 14. For cases where the printing system 10 prints double-sided images, some of the imaging devices 22 may be adapted to capture images of a second side of the receiver medium 14.

In some embodiments, the imaging devices 22 can be digital camera systems adapted to capture 2-D images of the receiver medium 14. In other embodiments, the imaging devices 22 can include 1-D linear sensors that are used to capture images of the receiver medium 14 on a line-by-line basis as the receiver medium 14 moves past the imaging system 20. The imaging devices 22 can equivalently be referred to as "cameras" or "camera systems" or "scanners" or "scanning systems," independent of whether they utilize 2-D or 1-D imaging sensors. Similarly, the images provided by the imaging devices 22 can be referred to as "captured images" or "scanned images" or "scans." In some embodiments, the imaging devices 22 include color sensors for capturing color images of the receiver medium, to more easily distinguish between the colorants deposited by the different printing modules 12, although this is not a requirement.

Figure 2:
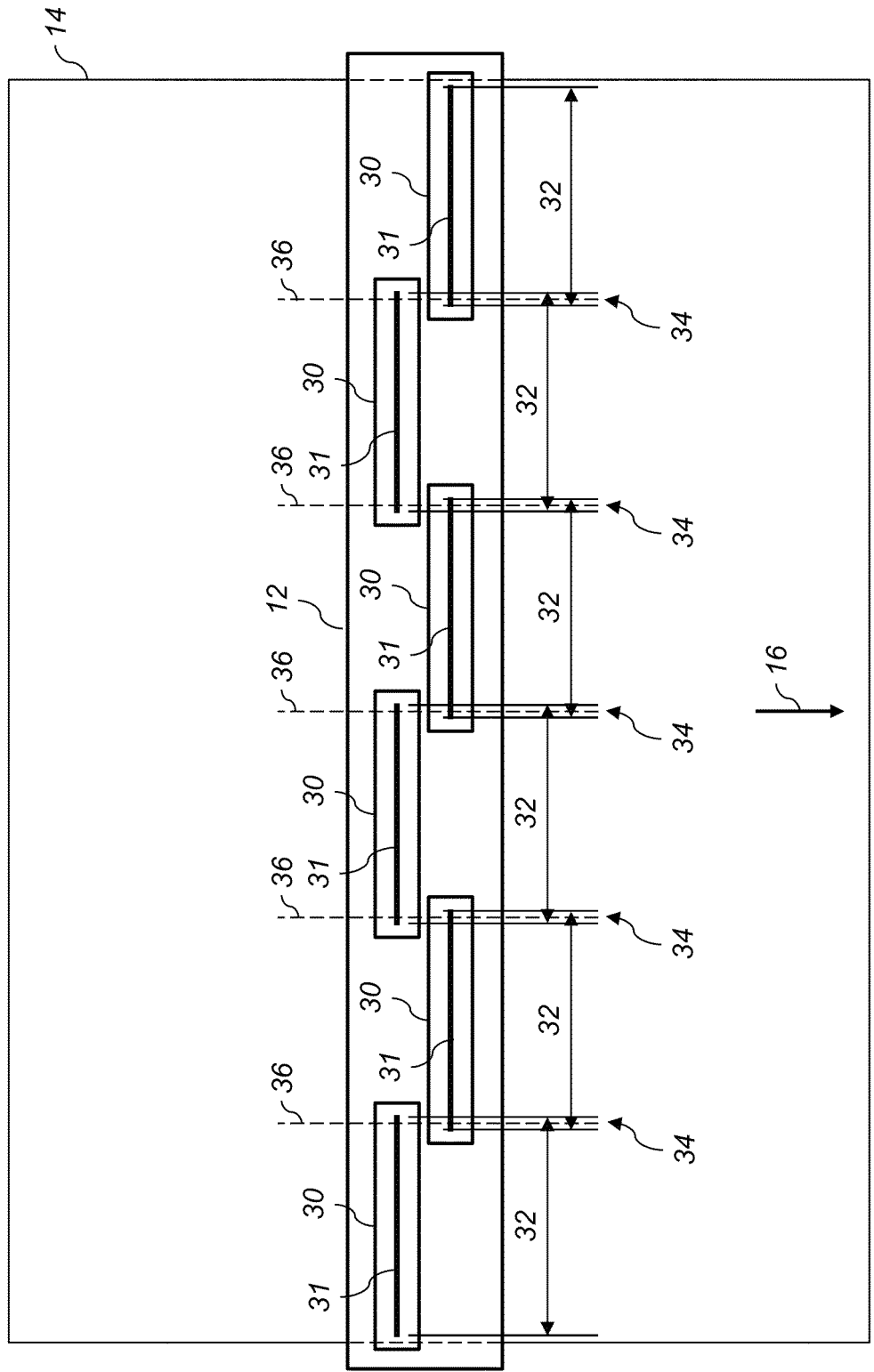
FIG. 2 is a diagram showing an exemplary printing module.

FIG. 2 is a diagram of a printing module 12 according to an exemplary embodiment. In this configuration, the printing module 12 is an inkjet printing system that includes a plurality of inkjet printheads 30 arranged across a width dimension of the receiver medium 14 in a staggered array configuration. (The width dimension of the receiver medium 14 is the dimension perpendicular to the receiver motion direction 16.) Such inkjet printing modules 12 are sometimes referred to as "lineheads."

Each of the inkjet printheads 30 includes a plurality of inkjet nozzles arranged in nozzle array 31, and is adapted to print a swath of image data in a corresponding printing region 32. In the illustrated example, the nozzle arrays 31 are one-dimensional linear arrays, but the invention is also applicable to inkjet printheads 30 having nozzles arrayed in two-dimensional arrays as well. Common types of inkjet printheads 30 include continuous inkjet (CI) printheads and drop-on-demand (DOD) printheads. Commonly, the inkjet printheads 30 are arranged in a spatially-overlapping arrangement where the printing regions 32 overlap in overlap regions 34. Each of the overlap regions 34 has a corresponding centerline 36. In the overlap regions, nozzles from more than one nozzle array 31 can be used to print the image data. Stitching systems and algorithms are used to determine which nozzles of each nozzle array 31 should be used for printing in the overlap region 34. Preferably, the stitching algorithms create a boundary between the printing regions 32 that is not readily detected by eye. One such stitching algorithm is described in commonly-assigned U.S. Pat. No. 7,871,145 to Enge, entitled "Printing method for reducing stitch error between overlapping jetting modules," which is incorporated herein by reference.

In accordance with embodiments the present invention, digital image data provided to the inkjet printheads 30 is modified to provide improved alignment between image content printed by different printing modules 12. The method can also be used to provide improved alignment between the printed image content and other printing system components (e.g., slitting, perforating, or folding systems).

A common source of misalignment is dimensional changes in the receiver medium 14 that can occur between the printing of one channel and another. For example, the absorption of water in the ink printed by one channel can cause the receiver medium 14 to expand before a subsequent channel is printed. Similarly, when the receiver medium 14 passes through a dryer, this can cause the receiver medium 14 to shrink. Such dimensional changes in the receiver medium 14 will generally be a function of a variety of factors such as media type, image content of the printed image, and environmental conditions. Dimensional changes can also result from other types of processing operations that are performed between the printing of one channel and another. For example, in an electrophotographic printing system, a fusing operation may be performed between the printing of a front side image and a back side image that can produce dimensional changes of the receiver medium 14. Misalignment can also result from a variety of other sources, including variations in the geometry of the printheads 30 during manufacturing, and variations in the positioning of the printheads 30 within the printing system 10.

Figure 3:
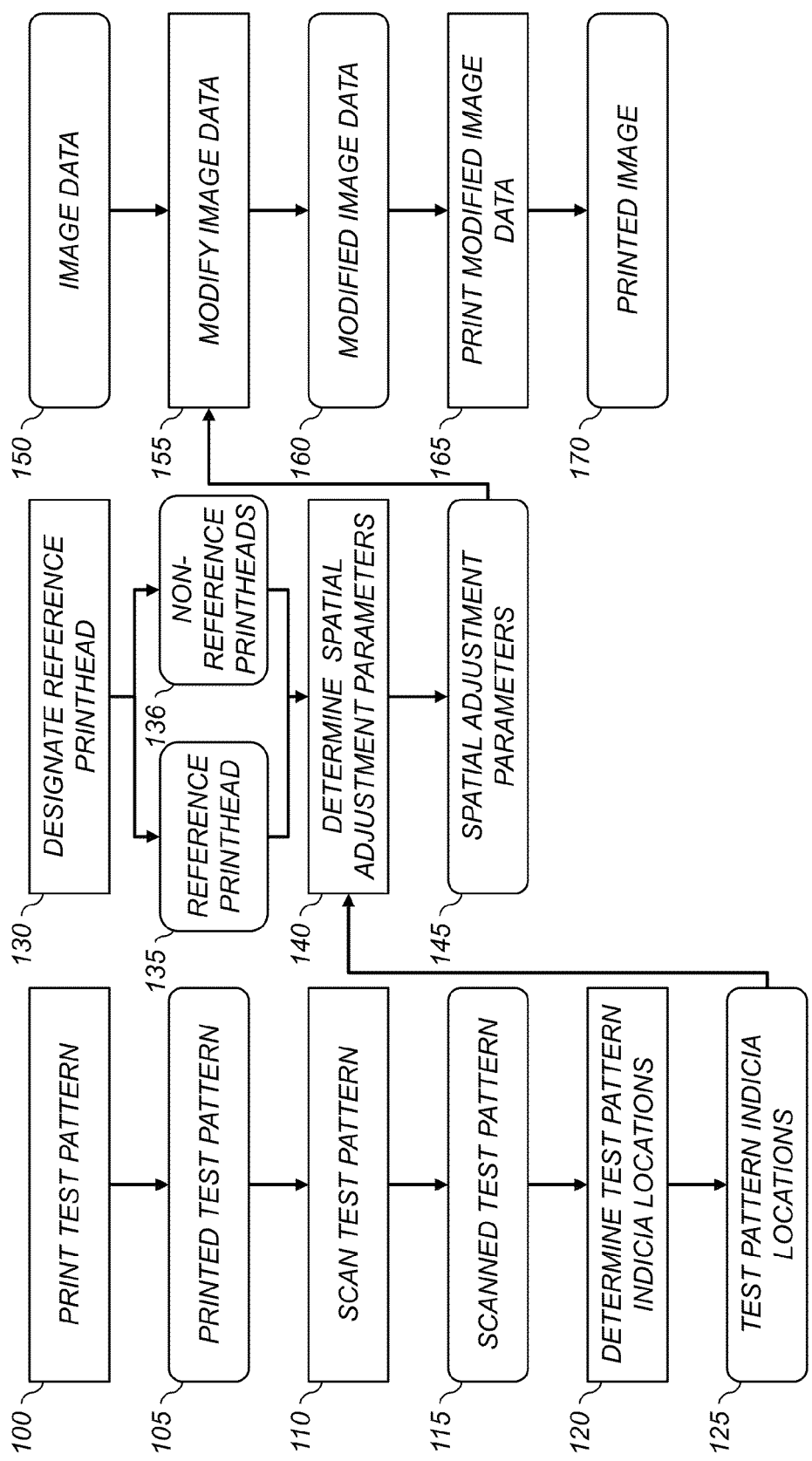
FIG. 3 is a flow chart of a method for providing a printed image having improved alignment according to an embodiment of the present invention.

FIG. 3 shows a flow chart of a method for providing a printed image 170 having improved alignment according to an embodiment of the present invention. A print test pattern step 100 is used to print a printed test pattern 105 on the printing system 10 (FIG. 1). The printed test pattern 105 includes test pattern indicia printed using individual printheads 30 (FIG. 2) in the printing modules 12 (FIG. 1) of the printing system 10.

Figure 4:
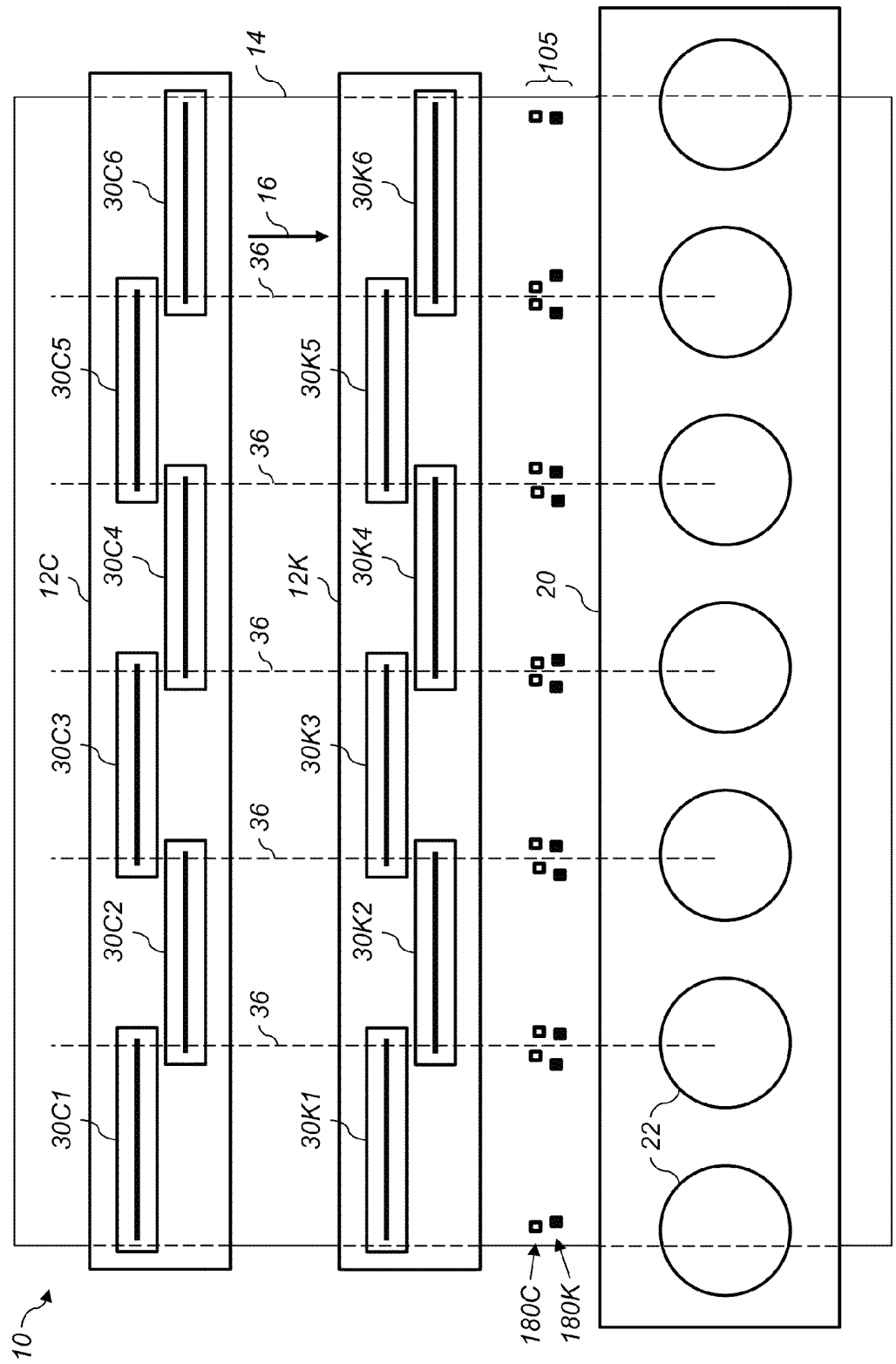
FIG. 4 shows an example of a printing system including a black printing module and a cyan printing module.

FIG. 4 shows an example of a printing system 10 including a cyan printing module 12C (including cyan printheads 30C1-30C6) and a black printing module 12K (including black printheads 30K1-30K6). (It will be obvious to one skilled in the art that the illustrated configuration can easily be extended to printing systems 10 including any number of printing modules 12.) A printed test pattern 105 is shown including cyan indicia 180C printed with the cyan printing module 12C and black indicia 180K printed with the black printing module 12K. In this example, the indicia printed by each printhead include a small square symbol printed with nozzles located near the end of the respective printhead. In other embodiments, the indicia can be cross-hair symbols, circular symbols, or any other appropriate type of symbols. Preferably, the indicia should be designed so that they are easily identified during subsequent image analysis operations.

In some embodiments, the indicia printed by the different printing modules 12 are intentionally offset from each other by a nominal offset so that the indicia in the printed test pattern 105 generally will not overlap. In the illustrated example, the black indicia 180K are offset in the receiver motion direction 16 (i.e., the "in-track direction") relative to the cyan indicia 180C. In some embodiments, the nominal positions of the black indicia 180K and the cyan indicia 180C in the width direction (i.e., the "cross-track direction") is the same, so that any differences in the positions of the indicia in the printed test pattern 105 will be due to undesired misalignment. In other embodiments, nominal offsets can be applied in the width direction as well.

Returning to a discussion of FIG. 3, a scan test pattern step 110 is used to image the printed test pattern 105, thereby providing a scanned test pattern 115. In a preferred embodiment, the scan test pattern step 110 is performed using imaging system 20 (FIG. 4) that is built into the printing system 10. In other embodiments, the scan test pattern step 110 can be performed using a separate imaging system. In the exemplary configuration shown in FIG. 4, the imaging system 20 includes a set of imaging devices 22, which are positioned on the centerlines 36 of the overlap regions 34 (FIG. 2) in order to image the indicia printed at the ends of the respective printheads 30. In some embodiments, one or more of the imaging devices 22 can be repositioned to different locations during a calibration process to sequentially image different portions of the printed test pattern 105. In other embodiments, a single imaging device 22 can be used to simultaneously image the entire width of the printed test pattern 105.

Next, the scanned test pattern 115 is automatically analyzed using a determine test pattern indicia locations 120 to determine test pattern indicia locations 125. Any image processing method known in the art can be used to determine the test pattern indicia locations 125. In a preferred embodiment, the individual symbols that comprise the indicia are located, and a centroid of the individual symbols is determined to define the test pattern indicia locations 125. Methods for performing such operations are well-known to one skilled in the art.

In some embodiments of the present invention, the alignment process of FIG. 3 is applied independently for each of the sets of printheads 30 (FIG. 2) in the printing modules 12 (FIG. 1) that are located at corresponding array positions. (Within the context of the present invention, an array position refers to the relative position of a printhead 30 relative to the width dimension of the receiver medium 14.) For example, in the example of FIG. 4, the cyan printhead 30C1 and the black printhead 30K1 are both at the left-most array position, and the cyan printhead 30C6 and the black printhead 30K6 are both at the right-most array position. The following example will be described relative to a particular group of printheads at a corresponding array position (e.g., cyan printhead 30C1 and black printhead 30K1).

A designate reference printhead step 130 is used to designate one of the printheads 30 in a particular array location to be a reference printhead 135 (e.g., black printhead 30K1 in FIG. 4). The other printheads 30 at the particular array location will be designated as non-reference printheads 136 (e.g., cyan printhead 30C1 in FIG. 4).

A determine spatial adjustment parameters step 140 is used to determine spatial adjustment parameters 145 for each of the non-reference printheads 136 responsive to the determined test pattern indicia locations 125. In a preferred embodiment, the spatial adjustment parameters 145 determined for each of the non-reference printheads 136 include a spatial size correction parameter (which is related to a size of the printed image) and a spatial offset parameter (relating to a spatial shift of the printed image).

In other embodiments, rather than designating an actual printhead 30 to be the reference printhead 135, a virtual reference printhead can be defined and used as a reference for all of the printheads 135. For example, the virtual reference printhead can be characterized by computing an average test pattern indicia locations 125 across all of the printheads 30. In this case, all of the printheads 30 are treated as non-reference printheads.

Figure 5:
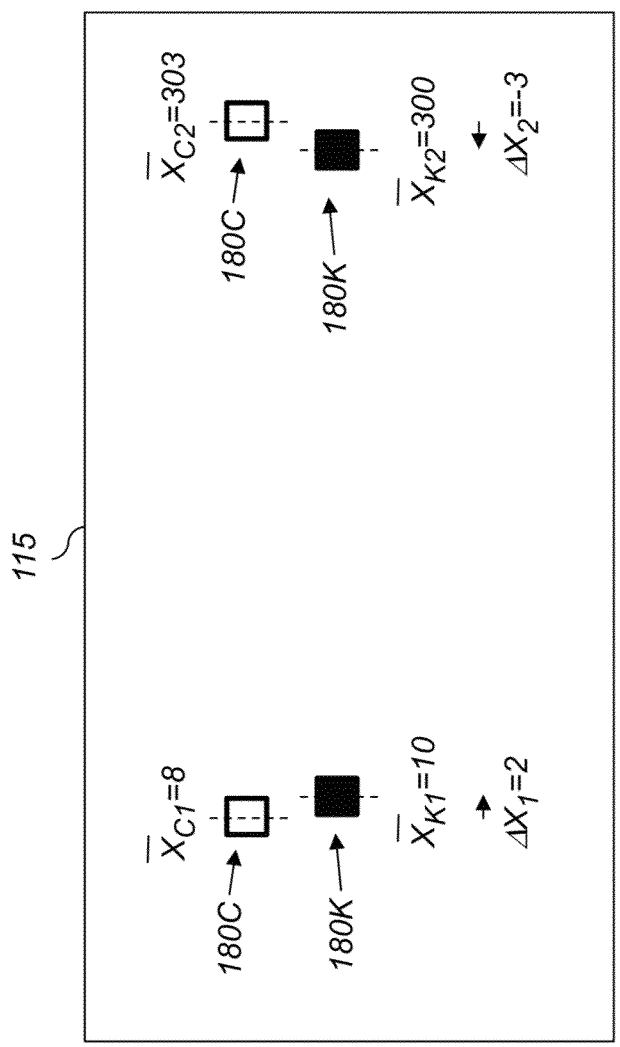
FIG. 5 shows an example of a scanned test pattern.

Consider the example scanned test pattern 115 shown in FIG. 5, which includes cyan indicia 180C and black indicia 180K printed by cyan printhead 30C1 and black printhead 30K1, respectively. The black printhead 30K1 can be designated as the reference printhead 135, and the cyan printhead 30C1 can be designated as a non-reference printheads 136. In this example, the test pattern indicia locations 125 in the cross-track direction for the left-most pair of indicia were determined to be $\overline{X}_{K1}=10$ and $\overline{X}_{C1}=8$. Similarly, the test pattern indicia locations 125 for the right-most pair of indicia were determined to be $\overline{X}_{K2}=300$ and 303. (The test pattern indicia locations 125 in this example are expressed in units of image pixels in the image data supplied to the printheads.) The positions of the indicia printed with the reference printhead 135 (i.e., $\overline{X}_{K1}$ and $\overline{X}_{K2}$) will be used to define reference test pattern indicia locations, from which position errors for the non-reference printhead 136 can be determined. Corresponding position errors $\Delta X_1$ and $\Delta X_2$ can be determined as:

$$\Delta X_1 = \overline{X}_{K1} - \overline{X}_{C1}$$

$$\Delta X_2 = \overline{X}_{K2} - \overline{X}_{C2} \qquad (1)$$

In this example $\Delta X_1 = 10-8=2$ and $\Delta X_2 = 300-303=-3$. In some embodiments, the position error $\Delta X_1$ is used as the spatial offset parameter for the non-reference printhead 136. In this case, the spatial offset parameter is $\Delta X_1=2$, indicating that the image data for the cyan printhead 30C1 should be shifted by 2 pixels relative to the image data for the black printhead 30K1.

A corresponding width error $\Delta W$ can be determined as:

$$\Delta W = \Delta X_2 - \Delta X_1 \qquad (2)$$

In this example, $\Delta W=(-3)-2=-5$. In some embodiments, the width error $\Delta W$ is used as the spatial size correction parameter. In other embodiments, the spatial size correction parameter can represent the required size correction in some other manner. For example, a spatial magnification factor can be determined responsive to the width error (e.g., $M=1+\Delta W/W$, where $W=\overline{X}_{K2}-\overline{X}_{K1}$).

Returning to a discussion of FIG. 3, a modify image data step 155 is used to modify image data 150 to be printed by the non-reference printheads 136 responsive to the determined spatial adjustment parameters 145. As discussed above, in a preferred embodiment, the spatial adjustment parameters 145 determined for each of the non-reference printheads 136 include a spatial offset parameter (e.g., $\Delta X_1$) and a spatial size correction parameter (e.g., $\Delta W$).

In a preferred embodiment, the image data 150 for a particular image line (I(x)) is shifted in a cross-track direction responsive to the spatial offset parameter ($\Delta X_1$) to provide a modified image line (I'(x)) in order to align the left edge of the printed image from the non-reference printheads 136 with the left edge of the printed image from the reference printhead 135:

$$I'(x) = I(x - \Delta X_1) \quad (3)$$

The width of the image data 150 is also modified using a resize operation in accordance with the spatial size correction parameter to increase or decrease the width dimension of the image data 150. In some embodiments, the modify image data step 155 is applied to continuous-tone image data. (Within the context of the present invention, continuous-tone image data refers to multi-bit image data having more than two pixel values, e.g., 3 bit/pixel image data having 8 different pixel values or 8 bit/pixel image data having 256 different pixel values). In such cases, the resize operation can use a conventional interpolation process (e.g., linear interpolation or cubic interpolation) to resize the image data. However, in many applications the image data 150 that is available to be processed by the modify image data step 155 is binary data that has been processed by a halftoning operation earlier in the imaging chain. The use of conventional interpolation methods to resize binary data is generally not appropriate.

In a preferred embodiment, when the image data 150 is binary, the resizing operation applied by the modify image data step 155 includes selectively inserting new image pixels when the spatial size correction parameter indicates that the size of the printed image should be increased, or selectively deleting image pixels when the spatial size correction parameter indicates that the size of the printed image should be decreased.

The pixel positions that the image pixels are inserted or deleted can be determined in a variety of ways. In some embodiments, the pixel positions can be selected randomly. However, this has the disadvantage that it can result in ragged edges on image content such as text characters since the edge positions can randomly be shifted for each image line. In a preferred embodiment, the image pixels are inserted or deleted in input pixel neighborhoods that are positioned according to a predefined pattern. The input pixel neighborhoods are replaced with modified pixel neighborhoods having one more or one less image pixel as appropriate. As will be described below, the pixel values of the image pixels in the modified pixel neighborhoods are preferably determined based on rules defined for a set of predefined pixel patterns.

Once the modified image data 160 is determined, a print modified image data step 165 is used to print the modified image data using the corresponding printheads 30 to provide a printed image 170.

In some embodiments, the spatial adjustment parameters 145 are determined during a calibration process, which is performed before a job is printed. The image data 150 can then be modified in real time while the image data is being printed. The calibration process can be performed on various schedules. For example, it can be performed whenever a different type of receiver medium 14 is loaded into the printing system 10. In some cases, the calibration process can be performed on a regular schedule (e.g., at the start of each day, or before each new print job). The calibration process can also be performed on an as needed basis whenever an operator determines that the printed images contain significant misalignment.

In some embodiments, a plurality of printed test patterns 105 are printed during the calibration process, and the spatial adjustment parameters 145 can be determined by combining the results obtained from the set of printed test patterns 105. For example, spatial adjustment parameters 145 can be determined individually from each of the printed test patterns 105, and then they can be combined to determine average spatial adjustment parameters 145. Alternately, the test pattern indicia locations 125 for the from the set of printed test patterns can be averaged to determine average test pattern indicia locations 125 The spatial adjustment parameters 145 can then be determined from the average test pattern indicia locations 125. These approaches have the advantage that it will be less sensitive to process variability.

In some embodiments, printed test patterns 105 are produced at regular intervals during the printing process and scanned using an in-line imaging system 20. Accordingly, the spatial adjustment parameters 145 can be updated in real time if any changes in the test pattern indicia locations are detected. In some embodiments, the spatial adjustment parameters 145 can be updated based completely on the most recent printed test patterns 105. In other embodiments, the results of the most recent printed test patterns 105 can be combined with the results from one or more previous printed test patterns 105 (e.g., by performing a moving average of the detected test pattern indicia locations 125, or by performing a moving average of the spatial adjustment parameters 145).

In some embodiments, the imaging system 20 may only include imaging devices 22 that are positioned to image a subset of the test pattern indicia (e.g., those at the left and right edges of the receiver medium 14) during the operation of the printer. In this case, it will not be possible to directly determine spatial adjustment parameters for each of the individual array positions. However, it is still possible to monitor an overall spatial offset and spatial size for each channel. The spatial adjustment parameters 145 for each array position that were determined using a full calibration process can then be updated accordingly. For example, if it is determined that the total image size for a particular channel has decreased with time, then the spatial size correction parameters for the corresponding printheads 30 can be adjusted accordingly by distributing any required corrections among the printheads 30.

Figure 6:
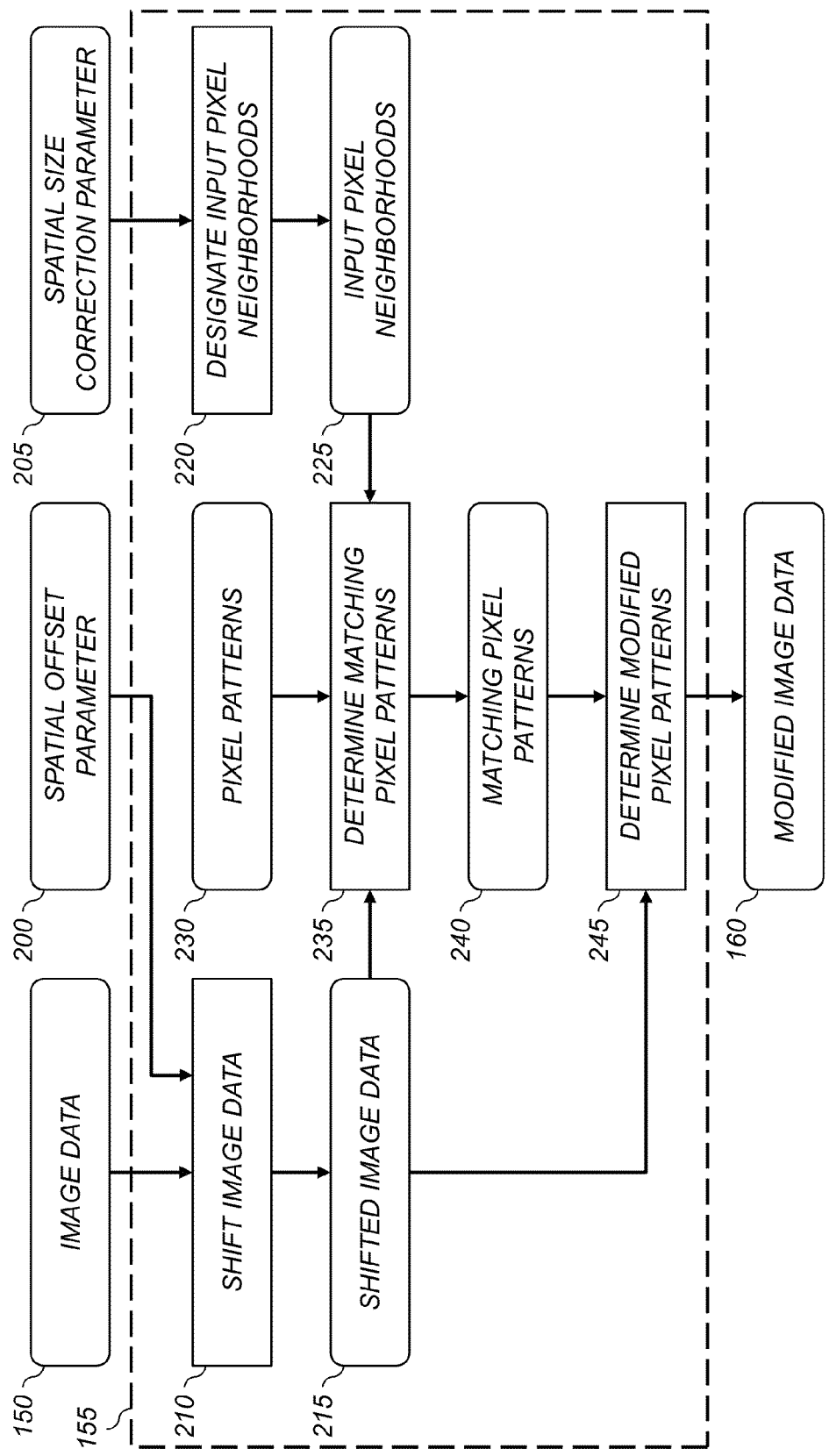
FIG. 6 is a flowchart showing additional details of the modify image data step of FIG. 3.

FIG. 6 is a flowchart showing additional details of the modify image data step 155 according to a preferred embodiment in which the image data 150 is modified responsive to a spatial offset parameter 200 and a spatial size correction parameter 205.

A shift image data step 210 is used to shift the image data 150 in accordance with the spatial offset parameter 200 to provide shifted image data 215. In a preferred embodiment, the shift image data step 210 determines the shifted image data 215 according to Eq. (3).

A designate input pixel neighborhoods step 220 designates a set of input pixel neighborhoods 225 in which an input pixel should be inserted or deleted in accordance with the spatial size correction parameter 205. In some embodiments, the spatial size correction parameter 205 indicates the total number of input pixels that should be inserted or deleted across the width of the printhead 30. In this case, the number of input pixel neighborhoods 225 that are designated will be given directly by the magnitude of spatial size correction parameter 205. The size of the input pixel neighborhoods 225 will generally be fixed. In a preferred embodiment, the input pixel neighborhoods 225 include a 4×1 array of input pixels.

Figure 7:
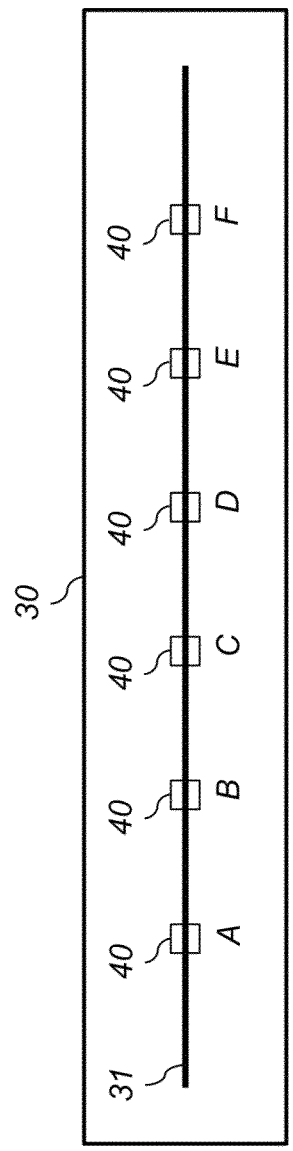
FIG. 7 shows an exemplary set of six adjustment zones.

In a preferred embodiment, the input pixel neighborhoods 225 are selected from a set of predefined adjustment zones. FIG. 7 shows an exemplary set of six adjustment zones 40 (labeled A-E) distributed at predefined positions across the width of the nozzle array 31 for a printhead 30. Preferably, none of the adjustment zones 40 are located in the overlap regions at the ends of the printheads 30, which are used for stitching with neighboring printheads 30.

The input pixel neighborhoods 225 can be selected from the adjustment zones 40 in a variety of ways. In some embodiments, the input pixel neighborhoods 225 are selected according to a predefined pattern, such as that shown in Table 1. Accordingly, if the spatial size correction parameter 205 indicates that one input pixel should be inserted, then adjustment zone C is selected for the input pixel neighborhood 225. Similarly, if the spatial size correction parameter 205 indicates that three input pixels should be inserted, then adjustment zones C, E and A are selected for the input pixel neighborhood 225.

TABLE 1

Adjustment zones selected to insert image pixels.

| Number of Inserts | Adjustment Zones Selected |
|---|---|
| 1 | C |
| 2 | CE |
| 3 | CEA |
| 4 | CEAD |
| 5 | CEADF |
| 6 | CEADFB |

In some embodiments, different input pixel neighborhoods 225 can be selected for deleting image pixels than those that are selected for inserting image pixels. Table 2 shows an exemplary pattern of adjustment zones 40 to be selected from which image pixels should be deleted.

TABLE 2

Adjustment zones selected to delete image pixels.

| Number of Deletes | Adjustment Zones Selected |
|---|---|
| 1 | D |
| 2 | DB |
| 3 | DBF |
| 4 | DBFC |
| 5 | DBFCA |
| 6 | DBFCAE |

In a preferred embodiment, a determine matching pixel patterns step 235 is used to compare the input pixels in the input pixel neighborhoods 225 to a set of predefined pixel patterns 230 to determine corresponding matching pixel patterns 240. For the case where the input pixel neighborhoods 225 are 4×1 arrays of input pixels, there will be $2^4=16$ different pixel patterns 230 when the image data 150 is binary (see FIG. 8).

In various embodiments, different size input pixel neighborhoods 225 can be used (e.g., 5×1 or 4×2). Additionally, in some embodiments the image data 150 can have more than two levels (e.g., for an inkjet printer having multiple drop sizes). In general, the number of different pixel patterns 230 will be $M^N$, where M is the number of levels for the image data 150 and N is the total number of pixels in an input pixel neighborhood 225.

A determine modified pixel patterns step 245 is used to modify the shifted image data 215 responsive to the matching pixel patterns 240. Depending on whether the spatial size correction parameter 205 indicates that the image data 150 needs to be expanded or reduced, the determine modified pixel patterns step 245 will either replace the pixel pattern in input pixel neighborhood 225 with a modified pixel pattern that has either one more pixel or one less pixel than the input pixel neighborhood.

In a preferred embodiment, a set of rules are defined to control how pixels should be added or deleted, and a particular rule is associated with each of the matching pixel patterns 240. The rules can be defined using a variety of different strategies. In a preferred embodiment, the rules are defined so as to avoid inserting extraneous black pixels in white image regions or extraneous white pixels in black image regions, while maintaining the local average of the pixel values where possible.

FIG. 8 shows an example set of rules that can be used according to one embodiment. A set of pixel insertion rules 300 are defined for the case where a new pixel is inserted into the input pixel neighborhood 225. In a preferred embodiment, the new pixel is inserted between pixel #2 and pixel #3 in the input pixel patterns 230. The pixel insertion rules 300 indicate how the value of this new pixel should be determined. Some input pixel patterns 230 (patterns #1, #2, #9 and #10) are associated with a "pixel value=0" rule, while others are associated with a "pixel value=1" rule (patterns #7, #8, #15 and #16), which set the pixel value of the new pixel to a 0 or 1, respectively. Other input pixel patterns 230 (patterns #3-#6 and #11-#13) are associated with a "use error diffusion" rule. When the input pixel neighborhood 225 is determined to match one of these input pixel patterns 230, the pixel value of the new pixel is determined using an error diffusion algorithm, as will be described in more detail later.

In various embodiments, different criteria can used to specify the pixel insertion rules 300. In this exemplary embodiment, if the pixel values for pixels #2 and #3 are both equal to "0," then a "pixel value=0" rule is assigned. Similarly, if the pixel values for pixels #2 and #3 are both equal to "1," then a "pixel value=1" rule is assigned. Otherwise, a "use error diffusion rule" is assigned. These rules avoid inserting extraneous black pixels in white image regions or extraneous white pixels in black image regions.

An analogous set of pixel deletion rules 310 are defined for the case where a pixel is to be deleted from the input pixel neighborhood 225. In a preferred embodiment, pixels #2 and #3 in the input pixel patterns 230 are replaced with a single new pixel. The pixel deletion rules 310 indicate how the value of this new pixel should be determined.

The criteria used to specify the pixel deletion rules 310 in this exemplary embodiment are a little more complicated than those used for the pixel insertion rules 300. If pixels #2 and #3 are both equal to "0" and pixels #1 and #4 are the same, then a "pixel value=0" rule is assigned. Likewise, if pixels #2 and #3 are both equal to "1" and pixels #1 and #4 are the same, then a "pixel value=1" rule is assigned. Also, if pixel #2 is equal to "0" and the remaining pixels are all equal to "1", then a "pixel value=0" rule is assigned. Similarly, if pixel #2 is equal to "1" and the remaining pixels are all equal to "0", then a "pixel value=1" rule is assigned. Otherwise, a "use error diffusion rule" is assigned.

Figure 9:
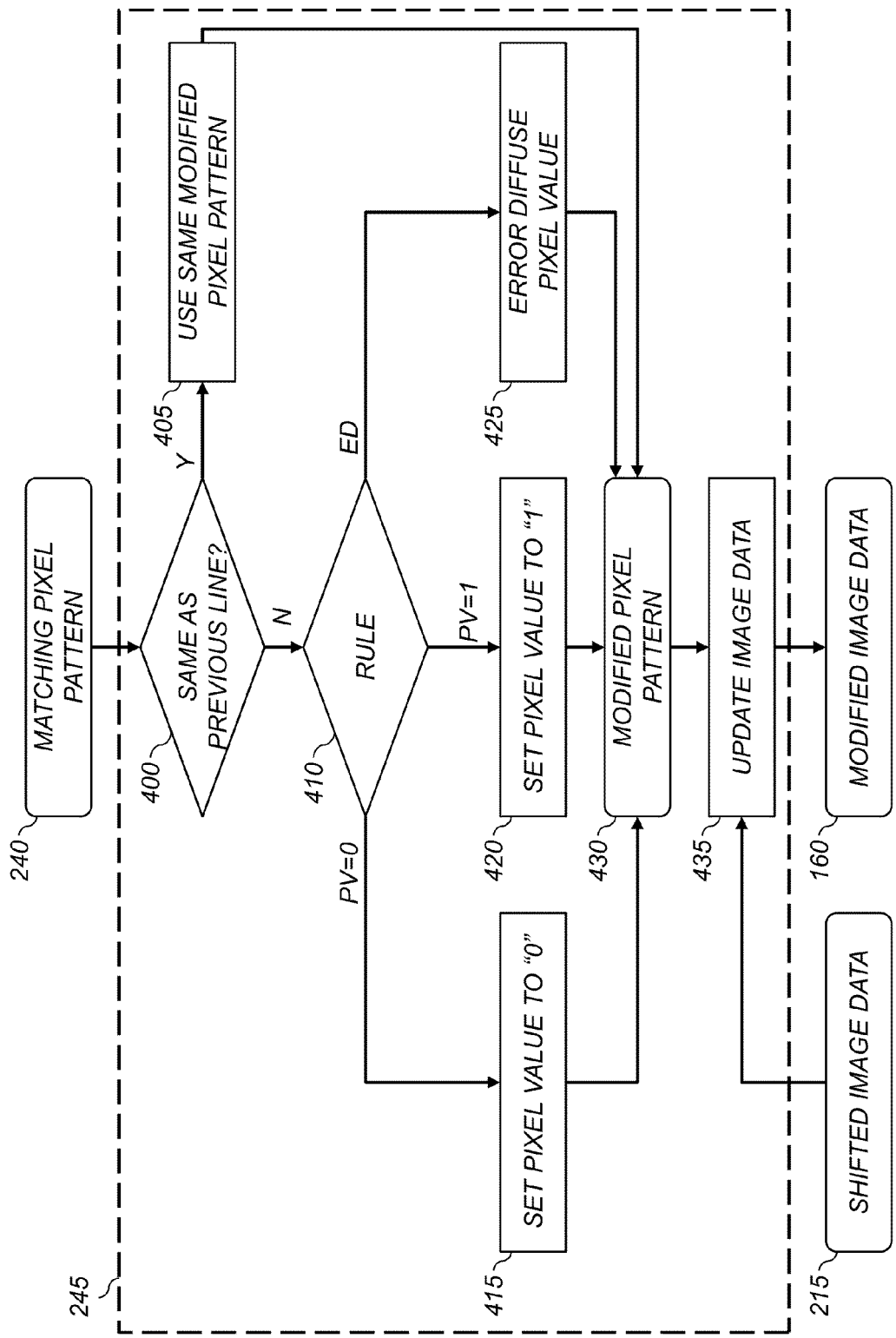
FIG. 9 is a flowchart showing additional details of the determine modified pixel patterns step of FIG. 6.

FIG. 9 is a flowchart showing additional details of the determine modified pixel patterns step 245 uses the defined rules to determine the modified image data 160 in accordance with an embodiment of the present invention. In order to avoid introducing raggedness to edges in the input image, a same as previous line test 400 is used to compare the matching pixel pattern 240 to the matching pixel pattern 240 that was determined for the previous line. If it is the same, a use same modified pixel pattern step 405 is used to set a modified pixel pattern 430 to the same pixel pattern that was determined for the previous line.

If the matching pixel pattern 240 is different than that found for the previous line, a rule test 410 determines the rule associated with the matching pixel pattern 240 and directs the determination of the new pixel value accordingly. If the corresponding rule is a "pixel value=0" rule, a set pixel value to "0" step 415 is used to set the pixel value of the new pixel to a value of "0." Similarly, if the corresponding rule is a "pixel value=1" rule, a set pixel value to "1" step 420 is used to set the pixel value of the new pixel to a value of "1." If the corresponding rule is a "use error diffusion" rule, an error diffuse pixel value step 425 is used to determine the pixel value of the new pixel using an error diffusion process.

Error diffusion processes are well-known in the image processing art. The error diffusion process used in a preferred embodiment of the error diffuse pixel value step 425 represents a variation of the conventional error diffusion processes that are typically used for halftoning images. In a conventional error diffusion process, the input gray level for a single input pixel is compared to a threshold value. If the gray level is above the threshold, the halftoned pixel value is set to "1" and a drop of ink will printed on the pixel. As a printed ink drop corresponds to complete coverage for the printed pixel, there is an error between the input pixel level and the resultant printed pixel density. This error value is then divided up and distributed (i.e., "diffused") to input pixels that have yet to be halftoned, altering their pixel values. When those input pixels are processed the modified pixel values (i.e., the original pixel value plus any error values that were distributed to it) are compared to the threshold. In this way, the average pixel value in a local neighborhood of the image will be approximately preserved.

In the present case, the input values to the error diffusion process are not gray level values for individual pixels, but rather they are a set of binary pixel values in the input pixel neighborhood 225. In a preferred embodiment, an original fill factor is determined corresponding to the fraction of pixels in the input pixel neighborhood 225 that have a value of "1" (i.e., the number of pixels where a drop of ink will be printed). When the pixels in the input pixel neighborhood 225 are modified by inserting or removing a pixel, the corresponding modified fill factor for the modified pixel pattern 430 will generally be different than the original fill factor. An error diffusion process can be used to diffuse the fill factor error to the input pixel neighborhoods 225 for future image lines that have not yet been processed, thereby preserving the average fill factor within a local image area. This has the effect of reducing visible print density shifts along the line of inserted or deleted pixels.

Consider the case where the matching pixel pattern 240 is pattern #5 in FIG. 8, and a pixel is to be inserted. The original fill factor was 1 drop in 4 pixels (i.e., $\frac{1}{4}$=0.25). If a "0" is inserted, the modified fill factor would be 1 drop in 5 pixels (i.e., $\frac{1}{5}$=0.20). If a "1" is inserted, the modified fill factor would be 2 drops in 5 pixels (i.e., $\frac{2}{5}$=0.4). In some embodiments, the error diffuse pixel value step 425 selects the pixel value that would produce the smallest error magnitude for the modified fill factor relative to the original fill factor. In this example, the inserted pixel would be set to a pixel value of "0" which produces a "fill factor error" of $\frac{1}{4}-\frac{1}{5}=\frac{1}{20}$=0.05. This fill factor error can be "diffused" by adding it to the original fill factor for the next line to provide a new aim fill factor. (Alternately, it can be divided and spread to a plurality of image lines.) In a preferred embodiment, the fill factor error is accumulated in an error buffer. For efficiency purposes, it may be desirable to store the error as an integer value. For example, the fill factor errors can be represented by an integer E, which is equal to 20× the fractional fill factor error (e.g., a fill factor error of $\frac{3}{20}$ would be represented as E=3). An analogous process is used for the case where a pixel is to be deleted.

In a preferred embodiment, fill factor errors are determined and accumulated in the error buffer even when the modified pixel patterns 430 are determined using the set pixel value to "0" step 415 or the set pixel value to "1" step 420. This reflects the fact that the modified fill factor is different from the original fill factor for many of the different pixel patterns 230. In some embodiments, when the accumulated fill factor error in the error buffer exceeds a predefined threshold (e.g., $E_t$=4), then the error diffuse pixel value step 425 sets the value of the new pixel to "1," otherwise it sets the value of the new pixel to "0."

In a preferred embodiment, if the use same modified pixel pattern step 405 is used to determine the modified pixel pattern 430, then fill factor errors are not determined and the accumulated fill factor error in the error buffer is not updated. This prevents a large amount of error from building up when there are extended regions of identical pixel patterns. In other embodiments, the fill factor errors are still accumulated even when the use same modified pixel pattern step 405 is used to determine the modified pixel pattern 430. In this case, it may be desirable to limit the magnitude of the accumulated fill factor errors.

FIG. 10A shows the modified pixel patterns 430 formed by the method of FIG. 9 for the case where a new pixel is to be inserted. Pixels #1 and #2 and pixels #3 and #4 are the same as the corresponding pixels in the input pixel patterns 230 of FIG. 8. A new pixel is inserted between pixel #2 and pixel #3, as shown by the shaded column in FIG. 10A. For the input pixel patterns 230 associated with the "pixel value=0" rule, the pixel value of the new pixel is fixed to either a "0." For the input pixel patterns 230 associated with the "pixel value=1" rule, the pixel value of the new pixel is fixed to either a "1." For the input pixel patterns 230 associated with the "use error diffusion" rule, the pixel value of the new pixel is determined using the error diffusion (ED) process, and therefore the pixel value will be either a "0" or a "1" depending on the fill factor errors accumulated from previous lines.

Similarly, FIG. 10B shows the modified pixel patterns 430 formed by the method of FIG. 9 for the case where a pixel is to be deleted. Pixels #1 and #4 are the same as the corresponding pixels in the input pixel patterns 230 of FIG. 8. Pixels #2 and #3 in the input pixel patterns 230 are replaced with a single new pixel, as shown by the shaded column in FIG. 10B. For the input pixel patterns 230 associated with the "pixel value=0" rule, the pixel value of the new pixel is fixed to either a "0." For the input pixel patterns 230 associated with the "pixel value=1" rule, the pixel value of the new pixel is fixed to either a "1." For the input pixel patterns 230 associated with the "use error diffusion" rule, the pixel value of the new pixel is determined using the error diffusion (ED) process, and therefore the pixel value will be either a "0" or a "1" depending on the fill factor errors accumulated from previous lines.

Returning to a discussion of FIG. 9, once the modified pixel pattern 430 has been determined, an update image data step 435 is used to replace the input pixel neighborhood 225 (FIG. 6), with the modified pixel pattern 430. Since the modified pixel pattern 430 will either be one pixel larger or one pixel smaller than the input pixel neighborhood 225, the modified image data 160 will be correspondingly larger or smaller than the image data 150 (FIG. 6). This has the effect of growing or shrinking the printed image formed using the non-reference printheads 136 (FIG. 3).

In the above described embodiments, one of the printheads 30 in a particular array location is designated to be a reference printhead 135, and then the image data for the non-reference printheads 136 is modified to align the printed image content produced by the non-reference printheads 136 to the image content produced by the reference printhead 135. In other embodiments, rather than using one of the printheads 30 as the reference, all of the printheads 30 can be corrected to a predefined fixed reference. This can be particularly useful for cases where the printed image content needs to be aligned with other printing system components (e.g., slitting, perforating, or folding systems). In such embodiments, rather than comparing the test pattern indicia locations 125 from the non-reference printheads 136 with those from the reference printhead 135, they are all compared to predefined reference indicia locations. The reference indicia locations can be determined based on theoretical positions if the printer components were all perfectly aligned and there was no dimensional changes in the receiver medium 14. In this case, all of the printheads can be treated as non-reference printheads 136 within the context of FIG. 3.

As noted earlier, the alignment errors that are corrected using the methods of the present invention can vary significantly as a function of the image content. For example, the receiver medium 14 will generally expand more for a page that includes image content that is printed using a large amount of ink relative to a page that is mostly blank paper. As a result, if the method of the present invention is only performed between print jobs, there could still be some degree of residual registration within the print job. As suggested earlier, in some embodiments, test patterns can be printed at various places within the print job and the alignment can be adjusted in real time during the printing of the print job. However, this approach cannot fix registration errors for pages that have already been printed. In some embodiments of the present invention, test patterns can be included along the edges of the receiver medium 14 at regular intervals (e.g., for each page of a multi-page print job). The printed test patterns 105 (FIG. 3) can then be scanned and analyzed to determine spatial adjustment parameters 145 that would be required to correct that page of the print job. The determined spatial adjustment parameters 145 for each page can then be stored in a processor-accessible memory. Then, when additional copies of the same print job are printed by the printing system 10, the stored page-dependent spatial adjustment parameters 145 can be recalled from the processor-accessible memory and used to modify the image data 150 for the corresponding pages. In this way, even if residual misalignment errors may be produced in the first copy of the print job, they can be corrected in subsequent copies.

The invention has been described in detail with particular reference to certain preferred embodiments thereof, but it will be understood that variations and modifications can be effected within the spirit and scope of the invention.

| PARTS LIST | |
|---|---|
| 10 | printing system |
| 12 | printing module |
| 12C | cyan printing module |
| 12K | black printing module |
| 14 | receiver medium |
| 16 | receiver motion direction |
| 18 | dryers |
| 20 | imaging system |
| 22 | imaging device |
| 30 | printhead |
| 30C1-30C6 | cyan printheads |
| 30K1-30K6 | black printheads |
| 31 | nozzle array |
| 32 | printing region |
| 34 | overlap region |

-continued

| PARTS LIST | |
|---|---|
| 36 | centerline |
| 40 | adjustment zones |
| 100 | print test pattern step |
| 105 | printed test pattern |
| 110 | scan test pattern step |
| 115 | scanned test pattern |
| 120 | determine test pattern indicia locations step |
| 125 | test pattern indicia locations |
| 130 | designate reference printhead step |
| 135 | reference printhead |
| 136 | non-reference printhead |
| 140 | determine spatial adjustment parameters step |
| 145 | spatial adjustment parameters |
| 150 | image data |
| 155 | modify image data step |
| 160 | modified image data |
| 165 | print modified image data step |
| 170 | printed image |
| 180C | cyan indicia |
| 180K | black indicia |
| 200 | spatial offset parameter |
| 205 | spatial size correction parameter |
| 210 | shift image data step |
| 215 | shifted image data |
| 220 | designate input pixel neighborhoods step |
| 225 | input pixel neighborhoods |
| 230 | pixel patterns |
| 235 | determine matching pixel patterns step |
| 240 | matching pixel patterns |
| 245 | determine modified pixel patterns step |
| 300 | pixel insertion rule |
| 310 | pixel deletion rule |
| 400 | same as previous line test |
| 405 | use same modified pixel pattern step |
| 410 | rule test |
| 415 | set pixel value to "0" step |
| 420 | set pixel value to "1" step |
| 425 | error diffuse pixel value step |
| 430 | modified pixel pattern |
| 435 | update image data step |

The invention claimed is:

1. A method for aligning digital image data for a digital printer including at least one printhead, comprising:
receiving one or more spatial adjustment parameters;
receiving digital image data including image pixels having pixel values;
modifying the digital image data to be printed with at least one printhead in accordance with the spatial adjustment parameters, wherein the modification of the digital image data includes:
designating an input pixel neighborhood within which an image pixel should be inserted or deleted based on the corresponding determined spatial adjustment parameters;
comparing the image pixels in the input pixel neighborhood to a plurality of predefined pixel patterns and identifying a matching pixel pattern; and
determining a modified pixel neighborhood having either one more image pixel or one less image pixel than the input pixel neighborhood, wherein the pixel values of the image pixels in the modified pixel neighborhood are determined responsive to the matching pixel pattern; and
printing the modified digital image data using the digital printer;
wherein the modification of the digital image data provides improved alignment of the printed image data with respect to a reference position.

2. The method of claim 1 wherein the spatial adjustment parameters are determined by:
   receiving one or more scanned test patterns formed by using an imaging device to capture an image of a test pattern printed using the digital printer, the test pattern including test pattern indicia printed using individual printheads;
   analyzing the scanned test patterns to detect locations of the printed test pattern indicia; and
   determining one or more spatial adjustment parameters for the individual printheads by comparing the detected locations of the corresponding printed test pattern indicia to predefined reference indicia locations.

3. The method of claim 2 wherein the digital printer is adapted to print images on a continuous web of receiver media and includes an imaging system positioned to capture images of the receiver medium downstream of the printheads, and wherein the imaging system is used to provide the scanned test pattern.

4. The method of claim 3 wherein the test pattern is printed and imaged at different times during the operation of the digital printer, and wherein the spatial adjustment parameters are updated in accordance with the most recent scanned test pattern.

5. The method of claim 3 wherein the digital printer is used to print multiple copies of a print job, and wherein spatial adjustment parameters determined from test patterns printed in association with one copy of the print job are used to provide modified digital image data for a subsequent copy of the print job.

6. The method of claim 5, wherein the print job includes a plurality of pages, and wherein different spatial adjustment parameters are determined for different pages.

7. The method of claim 1 wherein the spatial adjustment parameters include a spatial size correction parameter and wherein the number of image pixels to be inserted or deleted in the digital image data to be printed by a particular printhead is determined in accordance with the corresponding spatial size correction parameter.

8. The method of claim 1 wherein a plurality of different rules are defined by which the modified pixel neighborhoods can be determined, and wherein the rule to be used for a particular input pixel neighborhood is selected responsive to the matching pixel pattern.

9. The method of claim 8 wherein at least one of the rules includes setting at least one image pixel in the modified pixel neighborhoods to a predefined pixel value.

10. The method of claim 8 wherein at least one of the rules includes performing an error diffusion process.

11. The method of claim 10 wherein the error diffusion process computes an error signal representing a difference between a fill factor for the image pixels in the input pixel neighborhood and a fill factor for the image pixels in the modified pixel neighborhood and propagates the error signal to one or more nearby input pixel neighborhoods that have not yet been processed.

12. The method of claim 1 wherein the spatial adjustment parameters include a spatial offset parameter, and wherein the digital image data associated with a particular printhead is modified by applying a spatial shift operation to shift the digital image data in a width direction in accordance with the spatial offset parameter.

13. The method of claim 1 wherein the digital printer includes an array of printheads for each of a plurality of channels, and wherein spatial adjustment parameters are provided for each of the printheads.

14. The method of claim 1 wherein the digital printer is an inkjet printer, and wherein the printheads are inkjet printheads adapted to print drops of ink onto a receiver medium.

* * * * *